(12) United States Patent
Jang et al.

(10) Patent No.: US 8,080,345 B2
(45) Date of Patent: Dec. 20, 2011

(54) HIGH CAPACITY MICRO FUEL CELL SYSTEM

(75) Inventors: Jae Hyuk Jang, Gyunggi-Do (KR); Young Soo Oh, Gyunggi-Do (KR); Ki Pyo Hong, Gyunggi-Do (KR); Hong Ryul Lee, Gyunggi-Do (KR); Jae Hyoung Gil, Seoul (KR); Sung Han Kim, Gyunggi-Do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 963 days.

(21) Appl. No.: 11/783,647

(22) Filed: Apr. 11, 2007

(65) Prior Publication Data

US 2007/0243447 A1 Oct. 18, 2007

(30) Foreign Application Priority Data

Apr. 18, 2006 (KR) ........................ 10-2006-0034792

(51) Int. Cl.
*H01M 8/24* (2006.01)
*H01M 8/04* (2006.01)
*H01M 8/10* (2006.01)

(52) U.S. Cl. ......... 429/456; 429/454; 429/480; 429/513

(58) Field of Classification Search ........................ None
See application file for complete search history.

(56) References Cited

U.S. PATENT DOCUMENTS

| 6,569,553 | B1 * | 5/2003 | Koripella et al. | ............... 429/20 |
| 7,105,244 | B2 * | 9/2006 | Kamo et al. | .................. 429/456 |
| 2003/0059659 | A1 | 3/2003 | Kamo et al. | |
| 2003/0203271 | A1 * | 10/2003 | Morse et al. | .................... 429/38 |
| 2004/0142227 | A1 | 7/2004 | Sugai et al. | |
| 2004/0234836 | A1 * | 11/2004 | Orishima et al. | ............... 429/38 |
| 2005/0003263 | A1 * | 1/2005 | Mallari et al. | .................. 429/44 |

(Continued)

FOREIGN PATENT DOCUMENTS

DE 103 55 191 A1 3/2005

(Continued)

OTHER PUBLICATIONS

Japanese Office Action, w/ English translation thereof, issued in Japanese Patent Application No. JP 2007-108153 dated Oct. 26, 2010.

(Continued)

*Primary Examiner* — John S Maples
(74) *Attorney, Agent, or Firm* — McDermott Will & Emery LLP

(57) ABSTRACT

A high capacity micro fuel cell system for supplying power to a portable device. A fuel supply includes a fuel inlet formed at one side of a substrate and a gas outlet formed at the other side of the substrate. A pair of cell units are disposed at opposed sides of the substrate of the fuel supply, and each of the cell units includes catalyst layers and an electrolyte layer between the catalyst layers to generate current with fuel. Outer substrates are disposed at outer sides of the cell units, each of the substrates having through holes formed therein to define at least one oxygen supply for supplying oxygen to the electrolyte layers of the cell units. A holder integrally assembles the fuel supply, the cell units and the oxygen supply. The fuel cell system supplies high-capacity power to power supplies of portable electronic devices and can be mass-produced at low costs.

6 Claims, 8 Drawing Sheets

U.S. PATENT DOCUMENTS

2007/0139001 A1   6/2007   Hahn

FOREIGN PATENT DOCUMENTS

| DE | 103 46 310 A1 | 5/2005 |
|---|---|---|
| JP | 2003-086207 | 3/2003 |
| JP | 2003-272662 | 9/2003 |
| JP | 2004-335119 | 11/2004 |
| JP | 2007-59288 * | 3/2007 |
| JP | 2007-059288 | 3/2007 |

OTHER PUBLICATIONS

German Office Action, w/English translation thereof, issued in German Patent Application No. 10 2007 017 798.6 dated Oct. 4, 2011.

* cited by examiner

A-A

HIGH CAPACITY MICRO FUEL CELL SYSTEM

CLAIM OF PRIORITY

This application claims the benefit of Korean Patent Application No. 2005-0034792 filed on Apr. 18, 2006, in the Korean Intellectual Property Office, the disclosure of which is incorporated herein by reference.

BACKGROUND OF THE INVENTION

1. Field of the Invention

The present invention relates to a high capacity micro fuel cell system for supplying power to a portable device and, more particularly, to a high capacity micro fuel cell system, in which thin sheets are integrally assembled into a stacked structure using polydimethylsiloxane (PDMS), which is an elastomer, enabling mass-production and excellent power capacity.

2. Description of the Related Art

In general, fuel cells are classified into various types including polymer electrolyte membrane fuel cells, direct methanol fuel cells, molten carbonate fuel cells, solid oxide fuel cells, phosphoric acid fuel cells, and alkaline fuel cells. Of these types, the most extensively used ones are the direct methanol fuel cell (DMFC) and polymer electrolyte membrane fuel cell (PEMFC). The DMFC and PEMFC use the same constituents and material but differ in that they use methanol and hydrogen, respectively, thus having different but comparable capacities and fuel supply systems.

Recently, the researches on the DMFC have been actively under way because of its increased application value for a power source for portable devices. This is due to the fact that although having low output density, the DMFC has a simple fuel supply system to enable miniaturization of the overall structure.

A gaseous fuel cell has an advantage in that it has great energy density but requires caution in handling the hydrogen gas and additional equipment such as a fuel reforming apparatus for processing methane or alcohol to produce hydrogen gas or the fuel gas, thus resulting in a large volume.

On the contrary, although having low energy density, a liquid fuel cell using liquid as fuel is relatively manageable in terms of handling the fuel therefor and has a low driving temperature. In particular, it does not require a reformer, thus known to be suitable as a small, general-purpose portable power source.

Due to such advantages of the liquid fuel cells, many researches have been conducted on the DMFC, the most representative liquid fuel cell, to improve practical feasibility of the liquid fuel cells.

The DMFC generates power based on electromotive force generated from the reaction at a fuel electrode side in which methanol is oxidized and the reaction at an air electrode side in which oxygen is reduced. At this time, the reactions occurring at the fuel electrode side and the air electrode side are as follows.

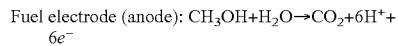
Fuel electrode (anode): $CH_3OH+H_2O \rightarrow CO_2+6H^++6e^-$

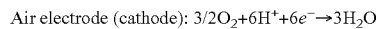
Air electrode (cathode): $3/2O_2+6H^++6e^- \rightarrow 3H_2O$

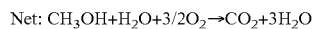
Net: $CH_3OH+H_2O+3/2O_2 \rightarrow CO_2+3H_2O$

Based on the above reaction equations, conventional researches have been mainly focused on the application of the fuel cells for the mobile and portable power sources. FIG. 1 illustrates a conventional unit fuel cell 300 in which an electrolyte layer 310 of a general solid polymer electrolyte membrane is disposed in the center with an anode 312a and a cathode 312b disposed at outer sides thereof. A methanol supply mechanism 330 and an oxygen supply mechanism 340 are installed at outer sides of the anode 312a and the cathode 312b, respectively.

The methanol supply mechanism 330 includes a methanol storage tank 332 and methanol and water supply pumps 334, and the oxygen supply mechanism 340 includes an oxygen compressor 342. As a result, the hydrogen fuel cell 300 has a large volume overall.

FIG. 2 illustrates another conventional technology, a PEMFC system 400 using hydrogen unlike the DMFC using methanol.

Such a PEMFC system 400 includes an electrolyte membrane 410 having an anode 412a and a cathode 412b, a hydrogen supply system 420 for supplying hydrogen to the anode 412a and the cathode 412b, and an air supply system 430 for supplying air.

The PEMFC system 400 generates electricity through the reactions below.

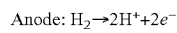
Anode: $H_2 \rightarrow 2H^++2e^-$

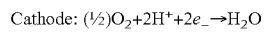
Cathode: $(1/2)O_2+2H^++2e^- \rightarrow H_2O$

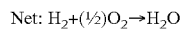
Net: $H_2+(1/2)O_2 \rightarrow H_2O$

The PEMFC system 400 using hydrogen is divided into a type in which hydrogen is directly supplied from a hydrogen storage tank (not shown) and a type in which liquid fuel such as methanol is reformed to extract hydrogen.

The first type requires supply of hydrogen from a hydrogen storage container. With the current technology with low efficiency in hydrogen storage, however, miniaturization of the entire system to the degree usable in a mobile phone does not seem feasible.

On the other hand, the second type, which involves using the reformer to supply hydrogen, hinders miniaturization of a fuel cell due to the structure of the reformer.

Therefore, there has been a need for developing a micro fuel cell which can be mounted on portable electronic devices such as mobile phones, PDAs, camcorders, digital cameras, notebook computers and the like, and has high capacity and can be manufactured with low costs.

SUMMARY OF THE INVENTION

The present invention has been made to solve the foregoing problems of the prior art and therefore an aspect of the present invention is to provide a high capacity micro fuel cell which has a stacked structure of thin sheets and can be applied to a power supply device such as a battery for a portable electronic device.

Another aspect of the invention is to provide a high capacity micro fuel cell system, which allows integrally assembling thin sheets into a stacked structure to enable mass production as well as high-capacity and high-efficiency power production.

According to an aspect of the invention, the invention provides a high capacity micro fuel cell system for supplying power to an electronic device. The micro fuel cell system includes a fuel supply having a fuel inlet formed at one side of a substrate and a gas outlet formed at the other side of the substrate, the substrate having a channel formed therein; a pair of cell units disposed at opposed sides of the substrate of the fuel supply, each of the cell units having catalyst layers and an electrolyte layer between the catalyst layers to generate current with fuel supplied through the fuel supply; outer substrates disposed at outer sides of the cell units, each of the substrates having through holes formed therein to define at least one oxygen supply for supplying oxygen to corresponding ones of the electrolyte layers of the cell units; and a holder integrally assembling the substrate of the fuel supply, the pair of cell units and the substrates of the oxygen supply.

According to the present invention, preferably, the substrates are made of one selected from the group consisting of ceramics, plastic material, low temperature co-fired ceramics, silicon material and micro-electromechanical systems material.

In addition, the holder includes covers enclosing the fuel supply, the pair of cell units and the outer substrates of oxygen supply, wherein the covers are integrally assembled by bonding a peripheral portion of one of the covers with a corresponding peripheral portion of the other cover by corona discharge.

In addition, each of the covers has an opening for exposing the through holes formed in the substrate of the oxygen supply to the outside air.

In addition, each of the covers has a plurality of through holes corresponding to the through holes of the oxygen supplies.

According to the present invention, preferably, the holder is made of polydimethylsiloxane.

According to the present invention, preferably, the holder is made of a mixture of polydimethylsiloxane and silica materials.

According to the present invention, preferably, the silica has a weight ratio of 0.1 to 50 wt % of the mixture of the silica material and polydimethylsiloxane.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
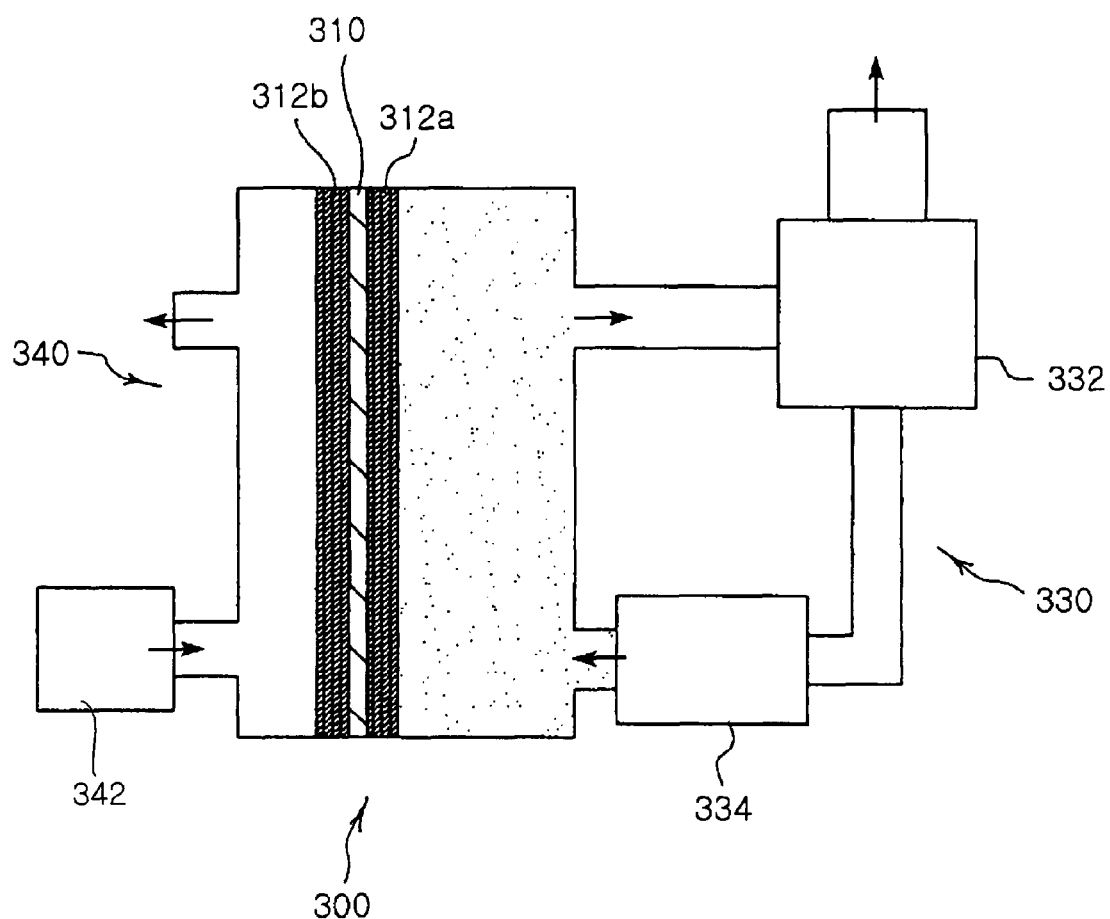
FIG. 1 illustrates a conventional fuel cell system using DMFC method.
Figure 2:
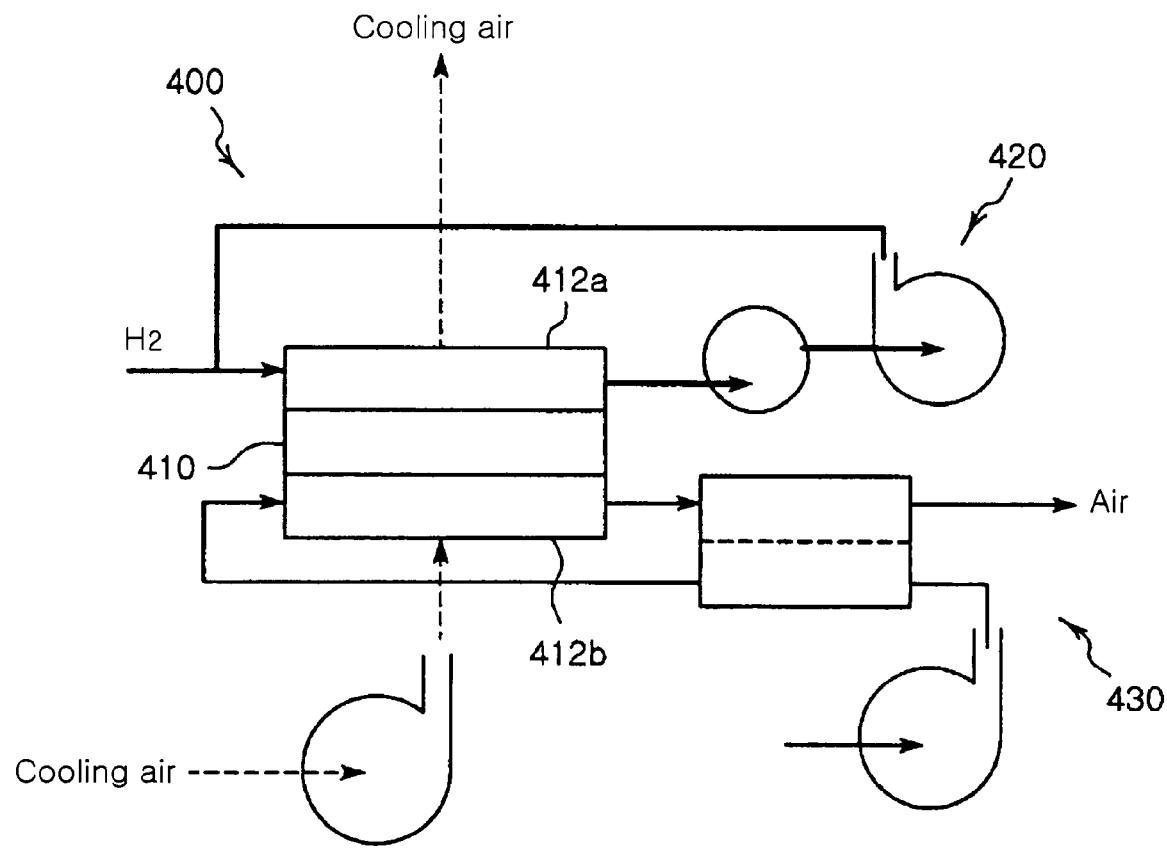
FIG. 2 is a sectional view illustrating a conventional fuel cell system using PEMFC method.
Figure 3:
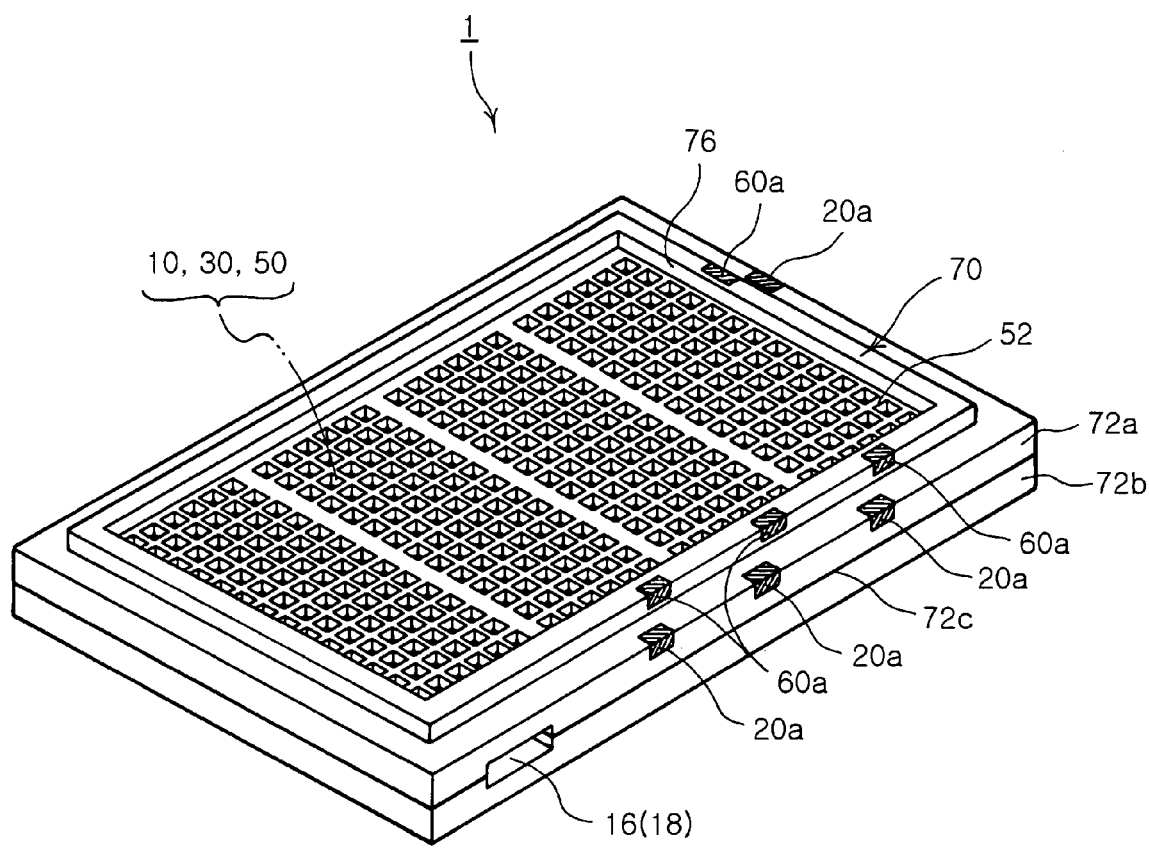
FIG. 3 is a perspective view illustrating the exterior of a high capacity micro fuel cell system according to a first embodiment of the present invention.

As shown in FIG. 3, a high capacity micro fuel cell system 1 according to a first embodiment of the present invention includes a fuel supply 10, a pair of cell units each having a plurality of cells 30 (or at least one cell) and a plurality of oxygen supplies 50 (or at least one oxygen supply) in a stacked structure, and a holder 70 for integrally assembling these.

That is, the fuel supply 10 is disposed in the center, the cells 30 are disposed at opposed outer sides of the fuel supply 10, and the oxygen supplies 50 are disposed at the opposed outer sides of the cells 30.

Preferably, the substrates 12 and 52 constituting the fuel supply 10 and the oxygen supplies 50 are composed of thin sheets made of one selected from the group consisting of ceramics, plastic material, Low Temperature Co-fired Ceramics (LTCC), silicon material and Micro-electromechanical Systems (MEMS) material.

The fuel supply 10 has a plurality of spaces 14a and 14b formed inside the substrate 12, with a fuel inlet 16 formed in one of the spaces 14a and 14b and a gas outlet 18 formed in the other one of the spaces 14a and 14b.

Figure 4:
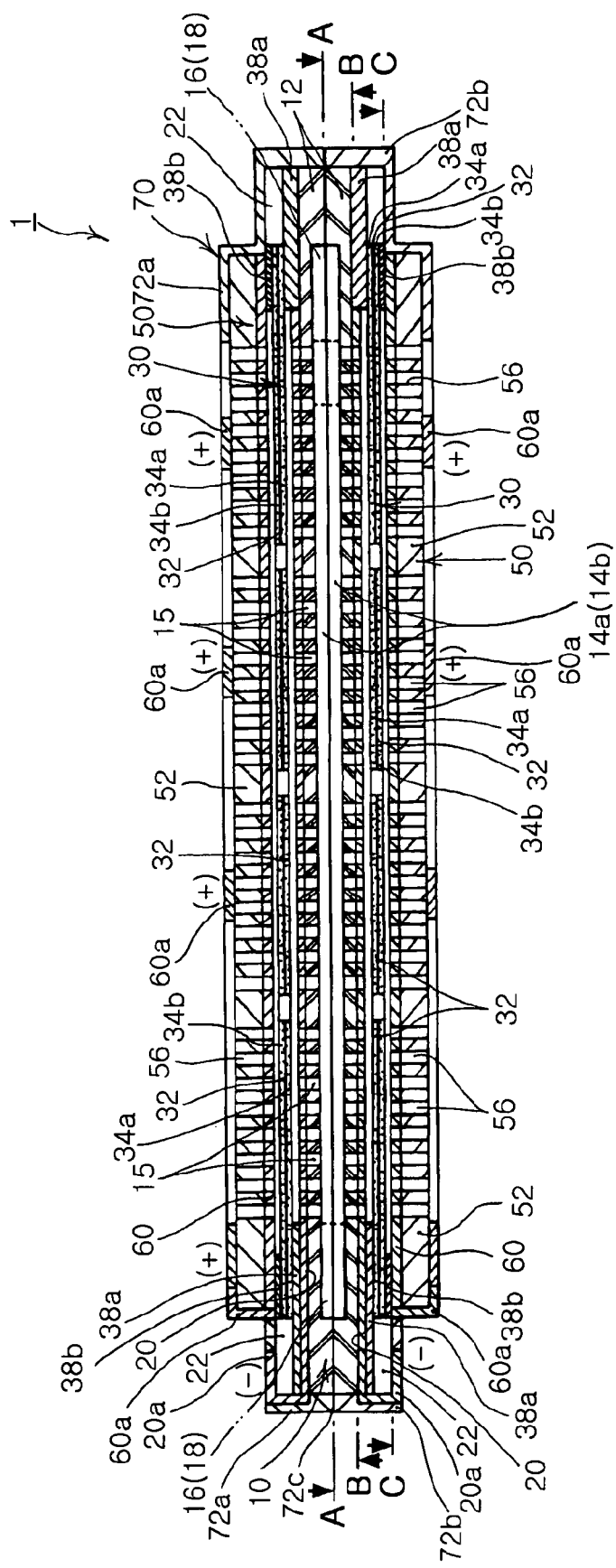
FIG. 4 is a sectional view illustrating the high capacity micro fuel cell system shown in FIG. 3.
Figure 5:
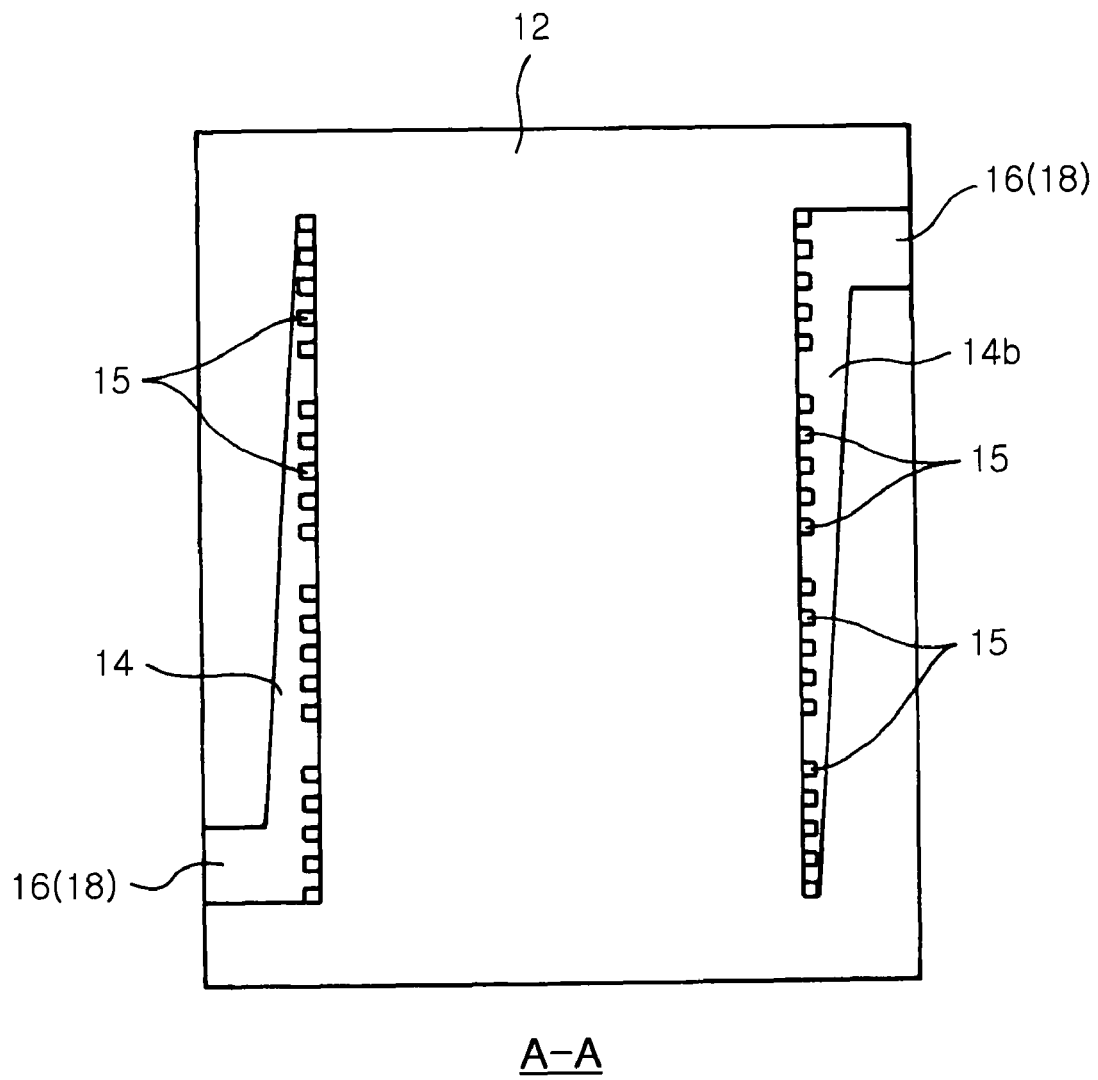
FIG. 5 is a sectional view cut along the line A-A of FIG. 4.
Figure 6:
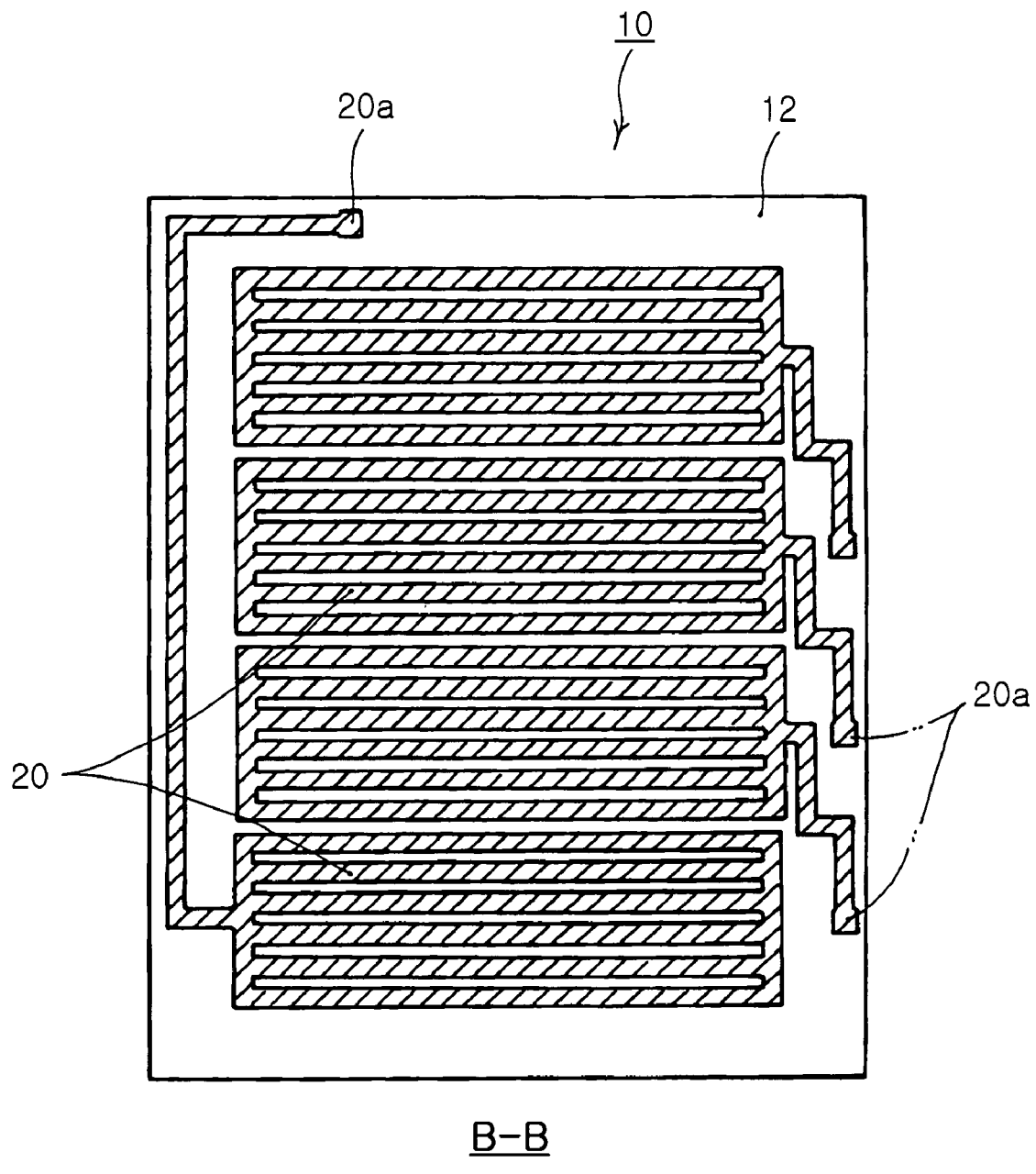
FIG. 6 is a sectional view cut along the line B-B of FIG. 4.

As shown in FIGS. 4 to 6, the fuel supply 10 has the fuel inlet 16 formed in the space 14a that forms an inner channel, and preferably, the fuel injected through the fuel inlet 16 includes hydrocarbon compound fuel such as methanol and dimethyl-ether (DME) or hydrogen. The waste gas discharged through the gas outlet 18 formed in the other space 14b includes carbon dioxide and non-reactive fuel gas.

In the present invention, as described later, as the fuel inlet 16 and the gas outlet 18 communicate with each other through the internal channel formed by through holes 15, the fuel inlet 16 can be utilized as the gas outlet 18 and vice versa.

In addition, in the fuel supply 10, as shown in FIG. 4, the spaces 14a and 14b inside the substrate 12 communicate with a plurality of cells 30 disposed adjacent to the fuel supply 10, through a plurality of through holes 15 formed in the substrate 12.

That is, the fuel gas flown into the space 14a of the substrate 12 of the fuel supply 10 flows to the cells 30 through the through holes 15, and generates electricity while passing through the cells 30, and then the waste gas is generated to flow into the space 14b through the plurality of through holes 15 of the substrate 12, exiting through the gas outlet 18.

In addition, a current collector 20 is formed in a pattern on the outer surface of the fuel supply 10 to collect the power generated at the cells 30 and induce the generated power to the outside. The current collector 20 has output terminals 20a formed at sides of another substrate 22 attached to the periphery of the substrate 12 of the fuel supply 10 so as to output the collected negative current to the outside.

The structure of such a current collector 20 is illustrated in FIG. 6. Such a current collector 20 is formed by being printed as a pattern on a side of the substrate 12, facilitating construction of a thinner structure.

In addition, according to the present invention, the cells 30 are disposed symmetrically at the opposed outer sides of the substrate 12 of the fuel supply 10. Each of the cells 30 has electrolyte layers 32 and catalyst layers 34a and 34b between the electrolyte layers 32 to generate current using the fuel supplied through the fuel supply 10.

Each of the cells 30 has a Membrane Electrode Assembly (MEA) 32, and the most representative example of such an MEA 32 includes Polybenzimidazole (PBI) membrane electrode.

In addition, the MEA 32 has the catalyst layers 34a and 34b made of Pt or Pt/Pd at the opposed sides thereof. The catalyst layers 34a and 34b promote ionization of hydrogen and thus have higher output density with a greater area thereof in contact with hydrogen. The catalyst layers 34a and 34b are connected to the negative current collector 20 at the side of the fuel supply 10 and a positive current collector 60 to be described later to induce the current produced in the cell to the outside.

In the meantime, in order to fix the electrolyte layer 32 and the catalyst layers 34a and 34b, thin supplementary substrates 38a and 38b are disposed, respectively, outside of and along the peripheries of the electrolyte layers 32.

In addition, the micro fuel cell system according to the present invention includes a plurality of oxygen supplies 50 disposed at the outer sides of the cells 30 and having through holes 56 formed in the substrate 52 to supply oxygen to the electrolyte layers 32 of the cells 30.

The oxygen supplies 50 have a plurality of through holes 56 penetrating through the substrate 52 to supply oxygen to the cells 30.

In order to induce the positive current generated from the cells 30 to the outside, the oxygen supplies 50 have current collectors 60 each formed as a pattern on a side of the substrate 52. Each of the current collectors 60 has output terminals 60a formed at peripheral sides of the substrate 52 of the oxygen supplies 50.

Figure 7:
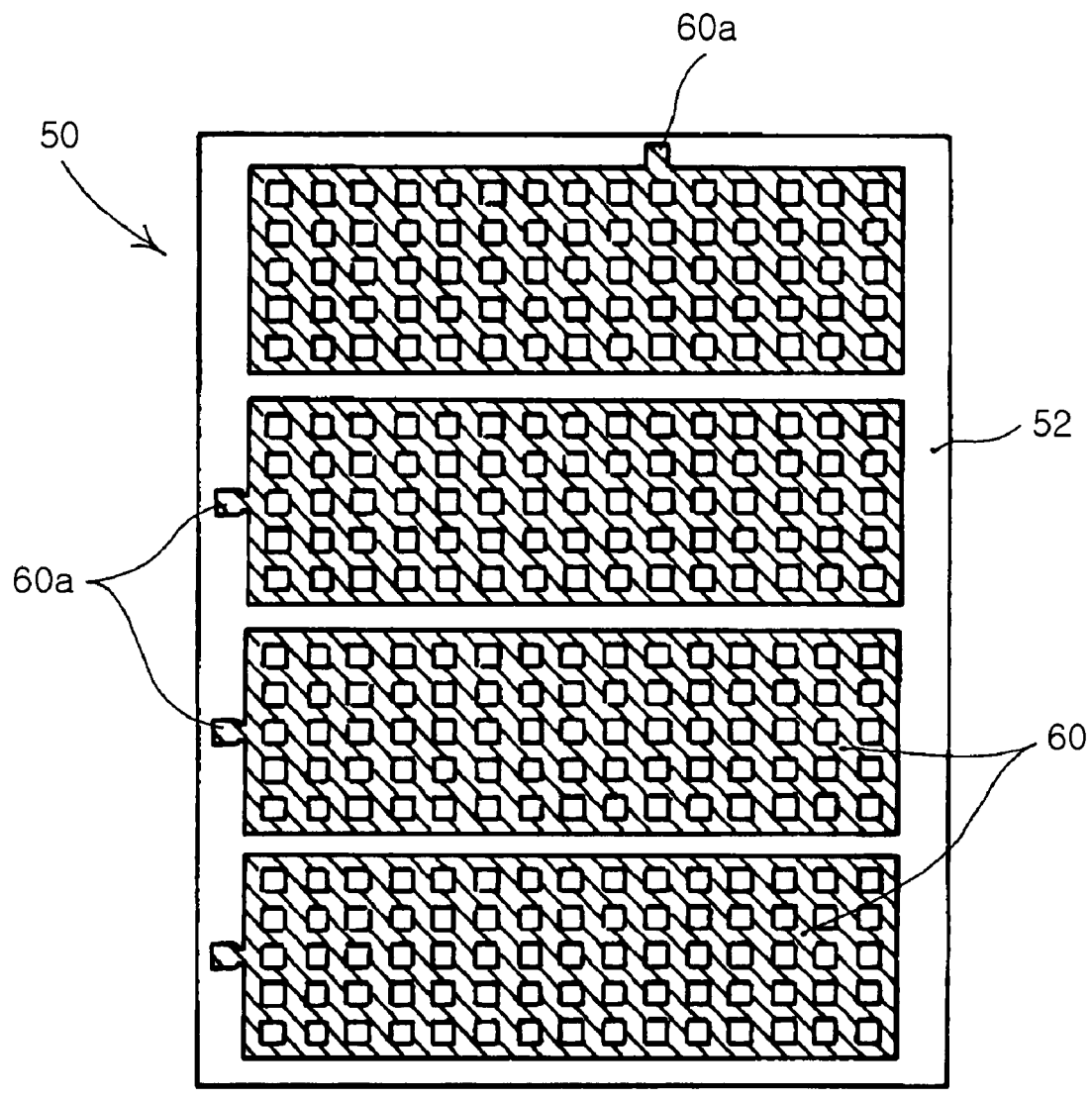
FIG. 7 is a sectional view cut along the line C-C of FIG. 4.

FIG. 7 illustrates the structure of the current collector 60. Such a current collector 60 is printed in the form of a net on a side of the substrate 52, facilitating construction of a thinner structure.

As shown in FIG. 7, each of the current collectors 60 of the oxygen supplies 50 is formed as a net-shaped pattern on one side of the substrate 52 facing the cells 30, and has terminals 60a formed on the other side of the substrate 52 to output the collected current.

In addition, according to the present invention, the micro fuel cell system further includes a holder 70 for integrally assembling the substrate 12 of the fuel supply 10, the plurality of cells 30 and the substrates 52 of the plurality of oxygen supplies 50.

As shown in FIG. 3, the holder 70 is made of Polydimethylsiloxane (PDMS), which is an elastomer.

The holder 70 includes a plurality of covers 72a and 72b made in advance of PDMS material. Placed to surround the substrate 12 of the fuel supply 10, the plurality of cells 30 and the substrates 52 of the plurality of oxygen supplies 50, the covers 72a and 72b are integrally assembled to each other by bonding peripheral portions 72c by corona discharge.

The fabrication process of the covers 72a and 72b of the holder 70 made of a PDMS material is as follows.

First, the PDMS material and a curing agent are mixed at a weight ratio of about 100:10 to prepare a well-blended mixture. Then, the PDMS mixture is aged for two hours in a vacuum state to remove air bubbles therein. By placing in such a vacuum state, the PDMS mixture becomes free of micro pores.

In general, a micro fuel cell system can be operated at about 300° C., and at this temperature, the PDMS material may be deformed by the heat. Therefore, the present invention proposes using a hybrid-type PDMS material to obtain durability at a high temperature. That is, preferably, the holder 70 is made of a mixture of silica and PDMS materials.

The mixture of the silica and PDMS materials enables operation of the fuel cell system at a high temperature while enhancing heat conductivity of the structure. Further, it can complement external strength and reduce the potential possibility of damage.

In addition, according to the present invention, preferably, the silica material can have a weight ratio of 0.1 to 50 wt % of the mixture of the silica and PDMS materials. More prefer-ably, the present invention mixes a silica powder into a PDMS solution. In the process, the silica powder and the PDMS solution are well blended, and the weight ratio of the silica powder is adjusted within the range of 0.1 to 50 wt %.

The mixture is aged for about an hour to eliminate air bubbles in the mixture of the silica powder and PDMS solution.

Next, a first cover 72a is fabricated by pouring the mixture of the silica powder and PDMS solution into an aluminum substrate (not shown) having a shape reproduced from the exterior of the stacked structure of the substrate 12 of the fuel supply 10, the plurality of cells 30 and the plurality of oxygen supplies 50, and curing the poured mixture for three hours at about 70° C.

Therefore, after such a curing process, the first cover 72a is detached from the aluminum substrate to surround in part the substrate 12 of the fuel supply 10, the plurality of cells 30 and the substrate 52 of the oxygen supplies 50.

In addition, a second cover 72b is fabricated to cover the rest of the areas of the substrate 12 of the fuel supply 10, the plurality of cells 30 and the substrates 52 of the plurality of oxygen supplies 50, except the areas covered by the first cover 72a.

After the first and second covers 72a and 72b are complete, they are used to cover the stacked structure of the substrate 12 of the fuel supply 10, the plurality of cells 30 and the substrates 52 of the oxygen supplies 50, and are integrally assembled by bonding the corresponding peripheral portions 72c thereof by corona discharge. For uniform bonding of the peripheral portions 72c, corona discharge is implemented for about 20 minutes and the peripheral portions 72c of the covers 72a and 72b are pressed against each other.

Through such a process, the fuel supply 10, the plurality of cells 30 and the plurality of oxygen supplies 50 are packaged.

FIG. 3 illustrates the finally packaged fuel cell system.

Each of the covers 72a and 72b of the holder 70 shown in FIG. 3 has an opening 76 for exposing the most of the substrate 52 of the oxygen supplies 50 so as to expose the through holes 56 of the oxygen supplies 50 to outside air.

Thus the high capacity micro fuel cell system 1 is complete.

In the high capacity fuel cell system 1 according to a first embodiment of the present invention with the above described configuration, fuel is supplied through the fuel inlet 16 of the fuel supply 10, gasified in the space 14a, and the fuel gas flows to the cells 30 disposed at the opposed sides from the fuel supply 10 via the through holes 15 formed in the substrate 12 of the fuel supply 10.

And the fuel gas comes in contact with the catalyst layer 34a of the MEA 32, and in the process, the fuel gas is dissociated into $H^+$ and electrons $e^-$, of which only the hydrogen ions selectively pass through the electrolyte layer 32 while the electrons $e^-$ are collected through the current collector 20 formed in a pattern on the substrate 12 of the fuel supply 10.

In the meantime, in the other catalyst layer 34b of the MEA 32 of the cell 30, the hydrogen ions $H^+$ react with the oxygen in the air flown through the through holes 56 formed in the substrate 52 of the oxygen supplies 50 to generate steam, which is discharged to the outside through the through holes 56. The current generated from this process is collected through the current collectors 20 and 60 formed in patterns on the fuel supply 10 and the oxygen supplies 50.

Therefore, the power collected from the current collectors 20 and 60 is used as a power source for mobile phones, PDAs, camcorders, digital cameras and notebook computers through the external terminals 20*a* and 60*a* of the substrates 12 and 52.

In the meantime, as the fuel gas flows as described above, the non-reactant gas, which was not consumed in electricity generation at the MEA 32, and carbon dioxide generated from electricity generation, exit through the gas outlet 18 formed at the other side of the substrate 12 of the fuel supply 10.

Figure 8:
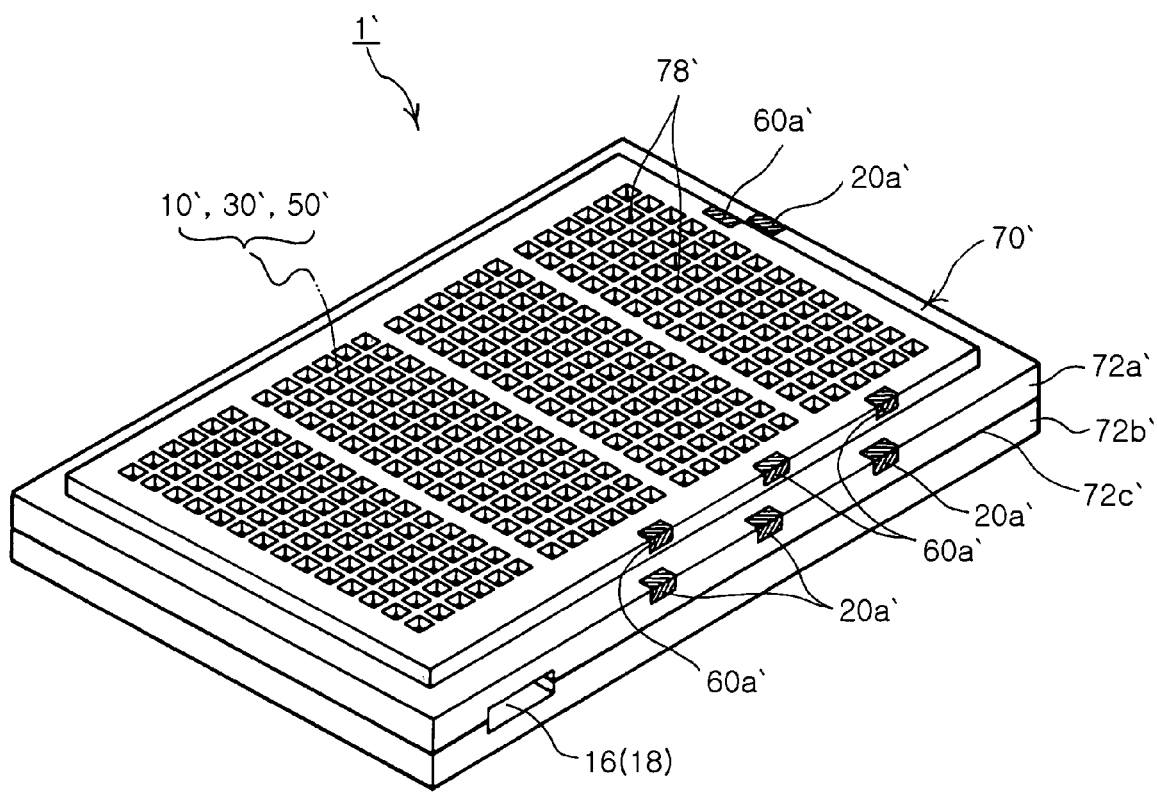
FIG. 8 is a perspective view illustrating the exterior of a high capacity micro fuel cell system according to a second embodiment of the present invention.

FIG. 8 illustrates a high capacity micro fuel cell according to a second embodiment of the present invention.

The high capacity micro fuel cell 1' according to the second embodiment has almost the same components as the high capacity micro fuel cell 1 described with reference to FIG. 3, and thus the same numbering was used to designate the same components but with the apostrophes next to the numbers.

According to the second embodiment of the present invention, the high capacity micro fuel cell system 1' includes first and second covers 72*a'* and 72*b'* which have a plurality of through holes 78' corresponding to the through holes 56' of the oxygen supplies 50', instead of the openings 76.

In this case, the holder 70' completely wraps and packages the fuel supply 10', the plurality of cells 30' and the plurality of oxygen supplies 50', with the through holes 78' provided in the first and second covers 72*a'* and 72*b'* for oxygen supply.

According to the present invention set forth above, all of the substrates constituting a fuel supply, cells and oxygen supplies are thin layers assembled into a stacked structure and made of one selected from the group consisting of ceramics, plastic material, LTCC, silicon material and MEMS material, allowing effective application to power supply devices such as batteries for portable electronic devices including mobile phones, PDAs, camcorders, digital cameras and notebook computers.

Furthermore, according to the present invention, thin layers are integrally assembled into a stacked structure by using PDMS which is an elastomer, thereby facilitating mass production, high capacity and high efficiency of the fuel cell system.

While the present invention has been shown and described in connection with the exemplary embodiments, it will be apparent to those skilled in the art that modifications and variations can be made without departing from the spirit and scope of the invention as defined by the appended claims.

What is claimed is:

1. A high capacity micro fuel cell system for supplying power to an electronic device, comprising:
   a fuel supply comprising a fuel inlet formed at one side of a substrate and a gas outlet formed at an other side of the substrate, the substrate having a channel formed therein;
   a pair of cell units disposed at opposed sides of the substrate of the fuel supply, each of the cell units comprising an anode catalyst layer, a cathode catalyst layer, and an electrolyte layer between the anode and cathode catalyst layers to generate current with fuel supplied through the fuel supply;
   outer substrates disposed at outer sides of the cell units, each of the substrates having through holes formed therein to define a plurality of oxygen supplies for supplying oxygen to corresponding cathode catalyst layers of the cell units; and
   a holder integrally assembling the substrate of the fuel supply, the pair of cell units and the outer substrates of the oxygen supply,
   wherein the holder comprises a mixture of polydimethylsiloxane and silica materials.

2. The high capacity micro fuel cell system according to claim 1, wherein the substrates are made of one selected from the group consisting of ceramics, plastic material, low temperature co-fired ceramics, and silicon material.

3. The high capacity micro fuel cell system according to claim 1, wherein the holder comprises covers enclosing the fuel supply, the pair of cell units and the at least one oxygen supply, wherein the covers are integrally bonded by corona discharge.

4. The high capacity micro fuel cell system according to claim 3, wherein each of the covers has an opening for exposing the through holes formed in the substrate of the oxygen supply to the outside air.

5. The high capacity micro fuel cell system according to claim 3, wherein each of the covers has a plurality of through holes corresponding to the through holes of the oxygen supplies.

6. The high capacity micro fuel cell system according to claim 1, wherein the silica comprises a weight ratio of 0.1 to 50 wt % of the mixture of the silica material and polydimethylsiloxane.

\* \* \* \* \*